US012799373B2

(12) United States Patent
Wang et al.

(10) Patent No.: US 12,799,373 B2
(45) Date of Patent: Nov. 17, 2026

(54) REPULPABLE RELEASE LINERS AND COMBINED COMPOSITIONS FOR PREPARING THE SAME

(71) Applicants: Dow Global Technologies LLC, Midland, MI (US); Rohm and Haas Company, Collegeville, PA (US); Dow Silicones Corporation, Midland, MI (US)

(72) Inventors: Xinhong Wang, Shanghai (CN); Shenglan Zhang, Shanghai (CN); Jeffrey M. Leitinger, Easton, PA (US); Fan Fei, Shanghai (CN); Fang Liu, Shanghai (CN)

(73) Assignees: Dow Global Technologies LLC, Midland, MI (US); Rohm and Haas Company, Collegeville, PA (US); Dow Silicones Corporation, Midland, MI (US)

( * ) Notice: Subject to any disclaimer, the term of this patent is extended or adjusted under 35 U.S.C. 154(b) by 196 days.

(21) Appl. No.: 18/857,267

(22) PCT Filed: May 13, 2022

(86) PCT No.: PCT/CN2022/092640

§ 371 (c)(1),
(2) Date: Oct. 16, 2024

(87) PCT Pub. No.: WO2023/216221

PCT Pub. Date: Nov. 16, 2023

(65) Prior Publication Data

US 2025/0270424 A1 Aug. 28, 2025

(51) Int. Cl.
*C09J 7/40* (2018.01)
*C09J 7/20* (2018.01)

(52) U.S. Cl.
CPC ............... *C09J 7/401* (2018.01); *C09J 7/201* (2018.01); *C09J 2301/414* (2020.08)

(58) Field of Classification Search
None
See application file for complete search history.

(56) References Cited

U.S. PATENT DOCUMENTS 5,084,317 A * 1/1992 Epple ................... D06N 3/0095 428/95
5,165,976 A * 11/1992 Newing ................... C09J 7/401 428/40.9

(Continued)

FOREIGN PATENT DOCUMENTS

CN 114341278 A 4/2022
JP 2017057257 A 3/2017

(Continued)

OTHER PUBLICATIONS

Winkler—WO 2019-215258 A1—IDS—MT—release layer w-silicone PSA—2019 (Year: 2019).*

*Primary Examiner* — John Vincent Lawler
(74) *Attorney, Agent, or Firm* — Boyle Fredrickson S.C.

(57) ABSTRACT

A repulpable release liner and a combined composition for preparing the same are disclosed. The combined composition comprises (A) a first formulation comprising a vinyl-functionalized polysiloxane, a non-vinyl polysiloxane, and a noble metal-siloxane complex catalyst; (B) a second formulation comprising at least one olefin copolymer and at least one olefin-(meth)acrylic copolymer. The first formulation is independent of the second formulation. The release liner prepared with the combined composition exhibits superior repulpability, rub resistance, coatability of release coating with desired release force and the like.

10 Claims, 1 Drawing Sheet

(56) References Cited

U.S. PATENT DOCUMENTS

| | | | |
|---|---|---|---|
| 5,624,751 | A | 4/1997 | Spies et al. |
| 8,663,743 | B2 | 3/2014 | Vonfelden et al. |
| 2004/0127121 | A1 | 7/2004 | Schwab et al. |
| 2019/0203420 | A1 | 7/2019 | Joyce et al. |

FOREIGN PATENT DOCUMENTS

| | | | | | |
|---|---|---|---|---|---|
| WO | 2012166870 | A1 | | 12/2012 | |
| WO | WO-2019215258 | A1 | * | 11/2019 | ........... C09D 183/04 |
| WO | 2020232629 | A1 | | 11/2020 | |
| WO | WO-2020232639 | A1 | * | 11/2020 | ........... G06F 18/214 |

* cited by examiner

REPULPABLE RELEASE LINERS AND COMBINED COMPOSITIONS FOR PREPARING THE SAME

FIELD OF THE INVENTION

The present disclosure relates to a unique repulpable release liner and a combined composition for preparing the same. The release liner and the combined composition are particularly designed to achieve superior performance properties such as repulpability of release liner, rub resistance and coat-ability of release coating with desired release force and the like.

BACKGROUND

Release liners are widely used in various commercial products, such as adhesive tape, self-adhesive label, protection membrane, packaging material, container, etc., which require temporary protection and layer-releasing immediately before usage. The release liner allows convenient transportation, storage and usage of the products but there are still some challenges in this field. Exemplary polyolefin-coated paper release liners are typically made out of high-density polyethylene (HDPE), low-density polyethylene (LDPE) and polypropylene (PP) plastic resins. Another example includes polyolefin-coated kraft papers, which are typically machine-finished kraft (MFK) papers and can be coated on either one or both sides to make them very smooth, moisture resistant and dimensionally stable. All of these release liners are not able to be repulpabled because of the existence of polyolefin extrusion coating. Therefore, one of the main challenges is that the use of those commercial products will produce significant amount of waste, especially peeled release liner, which has being brought about serious burden in technology, economy and environment protection, thus a complete and effective repulping of the waste are highly desirable. Some solutions have been reported in the prior art, but they have unexceptionally compromised one or more additional performance properties such as adhesion strength, releasing ability, wear resistance, mechanical strengths, etc. Therefore, there still remains a long-standing need for a unique repulpable release liner which can be readily and completely repulped without incurring the deterioration of any other performance properties such as those indicated above.

After persistent exploration, we have surprisingly developed a unique repulpable release liner and a combined composition for preparing the same which can achieve the above stated targets.

SUMMARY OF THE INVENTION

The present disclosure provides a unique repulpable release liner and a combined composition for preparing the same.

In a first aspect of the present disclosure, the present disclosure provides a combined composition for preparing repulpable release liner, comprising (A) a first formulation comprising a vinyl-functionalized polysiloxane, a non-vinyl polysiloxane, and a noble metal-siloxane complex catalyst; and (B) a second formulation comprising at least one olefin (co)polymer and at least one olefin-(meth)acrylic copolymer; wherein the first formulation is independent from the second formulation. According to an embodiment of the present disclosure, the first formulation is used for preparing a release layer of the repulpable release liner, and the second formulation is used for preparing an intermediate layer sandwiched between the release layer and the backing paper layer. According to another embodiment of the present disclosure, the first formulation is solventless.

In a second aspect of the present disclosure, the present disclosure provides a repulpable release liner prepared with the combined composition of the present disclosure, the release liner comprises (I) a release layer formed with the first formulation; (II) an intermediate layer formed with the second formulation; and (III) a backing layer, which can be a backing paper layer.

Other features and aspects of the present disclosure are discussed in greater detail below. It is to be understood that both the foregoing general description and the following detailed description are exemplary and explanatory only and are not restrictive of the invention, as claimed.

BRIEF DESCRIPTION OF THE DRAWINGS

For the purpose of illustrating the invention, there is shown in the drawings embodiments that are exemplary. However, it shall be understood that the present disclosure is not limited to the specific arrangements shown.

DETAILED DESCRIPTION OF THE INVENTION

Figure 1:
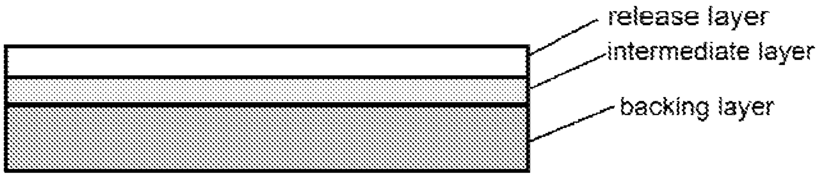
FIG. 1 is a schematic cross-section of a release liner according to an embodiment of the present disclosure.

Unless defined otherwise, all technical and scientific terms used herein have the same meaning as commonly understood by one of ordinary skill in the art to which the invention belongs. Also, all publications, patent applications, patents, and other references mentioned herein are incorporated by reference.

As disclosed herein, "and/or" means "and, or as an alternative". All ranges include endpoints unless otherwise indicated. The terms "polysiloxane" and "siloxane" are interchangeable and refer to molecules having multiple Si—O—Si linkages. The term "(meth)acrylic" refers to acrylic or methacrylic, "(meth)acrylic acid" refers to acrylic acid or methacrylic acid, "(meth)acrylate" refers to acrylate or methacrylate, and "(meth)acrylamide" refers to acrylamide or methacrylamide.

Without being limited to any specific theory, the technical breakthrough of the present disclosure mainly resides in the particularly designed combination of formulations for the release layer and the intermediate layer of a release liner. Especially, it is found that the combination of (A) a first formulation for release layer and (B) a second formulation for intermediate layer can produce a release liner exhibiting superior performance properties such as repulpability, wear resistance, curing ability and mechanical strength (e.g. tension strength, elongation at break, adhesion strength between the release layer and the backing layer, etc.).

It is also found that the categories and relative contents of the ingredients used for each of the above stated components can be further modified to achieve further improvements in the performance properties of the release liner.

The Formulation (A)

The formulation (A) comprises a vinyl-functionalized polysiloxane, a, and a one noble metal-siloxane complex catalyst.

According to an embodiment of the present disclosure, the vinyl-functionalized polysiloxane for formulation (A) is a polysiloxane comprising at least one vinyl group per molecule. Specifically speaking, the vinyl-functionalized polysiloxane may comprise at least one $ViSiO_{3/2}$, $VIR^1SiO_{2/2}$, or $Vi(R^2)_2SiO_{1/2}$ unit per molecule, and may further comprise at least one unit selected from the group consisting of $SiO_{4/2}$, $R^3SiO_{3/2}$, $(R^4)_2SiO_{2/2}$, $(R^5)_3SiO_{1/2}$, and any combinations thereof, wherein Vi represents vinyl group (—CH═CH$_2$), and each of $R^1$, $R^2$, $R^3$, $R^4$ and $R^5$ is independently selected from the group consisting of H, $C_1$-$C_{16}$ alkyl group and $C_1$-$C_{16}$ alkoxy group, and combinations thereof; according to an exemplary embodiment, each of $R^1$, $R^2$, $R^3$, $R^4$ and $R^5$ is independently $C_1$-$C_6$ alkyl group, such as methyl, ethyl, n-propyl, i-propyl, n-butyl, i-butyl, s-butyl, t-butyl, etc., or $C_1$-$C_6$ alkoxy group, such as methoxy, ethoxy, propoxy, butoxy, etc.

According to an embodiment of the present disclosure, the vinyl-functionalized polysiloxane comprises 0.05 to 8 wt % vinyl group, based on the total weight of the vinyl-functionalized polysiloxane, such as 0.1-6 wt %, or 0.2-5 wt %, or 0.3-3 wt %, or 0.35-2 wt %, or 0.4-1 wt %, or 0.5-0.8 wt %, or 0.6-0.7 wt %; for example, the vinyl content can be within a numerical range obtained by combining any two of the following two end point values: 0.1 wt %, 0.15 wt %, 0.2 wt %, 0.25 wt %, 0.3 wt %, 0.35 wt %, 0.4 wt %, 0.45 wt %, 0.5 wt %, 0.55 wt %, 0.6 wt %, 0.65 wt %, 0.7 wt %, 0.75 wt %, 0.8 wt %, 0.85 wt %, 0.9 wt %, 0.95 wt %, 1 wt %, 1.2 wt %, 1.5 wt %, 1.8 wt %, 2 wt %, 2.2 wt %, 2.5 wt %, 2.8 wt %, 3 wt %, 3.2 wt %, 3.5 wt %, 3.8 wt %, 4 wt %, 4.2 wt %, 4.5 wt %, 4.8 wt %, 5 wt %, 5.2 wt %, 5.5 wt %, 5.8 wt %, 6 wt %, 6.2 wt %, 6.5 wt %, 6.8 wt %, 7 wt %, 7.2 wt %, 7.5 wt %, 7.8 wt %, 8 wt %.

As generally known in the technical field of polysiloxane, the oxygen atom has a subscript of e.g. "½", "2/2", "3/2" and "4/2" since each of the oxygen actually is share by two silicon atoms. For example, "$Vi(R^2)_2SiO_{1/2}$" represents a unit having a formula of

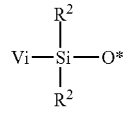

wherein the oxygen atom marked with asterisk is further attached to another silicon atom.

According to an exemplary embodiment of the present disclosure, the vinyl-functionalized polysiloxane comprises 0.01 to 25 wt % $Vi(R^2)_2SiO_{1/2}$ unit, based on the total weight of the vinyl-functionalized polysiloxane, such as 0.1-22 wt %, or 0.5-20 wt %, or 1-18 wt %, or 1.5-15 wt %, or 2-12 wt %, or 2.2-10 wt %, or 2.5-5 wt %; for example, the content of the $Vi(R^2)_2SiO_{1/2}$ unit can be within a numerical range obtained by combining any two of the following two end point values: 0.01 wt %, 0.05 wt %, 0.1 wt %, 0.15 wt %, 0.2 wt %, 0.25 wt %, 0.3 wt %, 0.35 wt %, 0.4 wt %, 0.45 wt %, 0.5 wt %, 0.55 wt %, 0.6 wt %, 0.65 wt %, 0.7 wt %, 0.75 wt %, 0.8 wt %, 0.85 wt %, 0.9 wt %, 0.95 wt %, 1 wt %, 1.2 wt %, 1.5 wt %, 1.8 wt %, 2 wt %, 2.2 wt %, 2.5 wt %, 2.8 wt %, 3 wt %, 3.2 wt %, 3.5 wt %, 3.8 wt %, 4 wt %, 4.2 wt %, 4.5 wt %, 4.8 wt %, 5 wt %, 5.2 wt %, 5.5 wt %, 5.8 wt %, 6 wt %, 6.2 wt %, 6.5 wt %, 6.8 wt %, 7 wt %, 7.2 wt %, 7.5 wt %, 7.8 wt %, 8 wt %, 10 wt %, 12 wt %, 15 wt %, 18 wt %, 20 wt %, 22 wt %, 25 wt %.

According to an exemplary embodiment of the present disclosure, the vinyl-functionalized polysiloxane comprises 0.01 to 20 wt % $ViSiO_{3/2}$, based on the total weight of the vinyl-functionalized polysiloxane, such as 0.1-18 wt %, or 0.5-16 wt %, or 1-15 wt %, or 1.5-12 wt %, or 2-10 wt %, or 2.2-8 wt %, or 2.5-5 wt %; for example, the content of the $ViSiO_{3/2}$ unit can be within a numerical range obtained by combining any two of the following two end point values: 0.01 wt %, 0.05 wt %, 0.1 wt %, 0.15 wt %, 0.2 wt %, 0.25 wt %, 0.3 wt %, 0.35 wt %, 0.4 wt %, 0.45 wt %, 0.5 wt %, 0.55 wt %, 0.6 wt %, 0.65 wt %, 0.7 wt %, 0.75 wt %, 0.8 wt %, 0.85 wt %, 0.9 wt %, 0.95 wt %, 1 wt %, 1.2 wt %, 1.5 wt %, 1.8 wt %, 2 wt %, 2.2 wt %, 2.5 wt %, 2.8 wt %, 3 wt %, 3.2 wt %, 3.5 wt %, 3.8 wt %, 4 wt %, 4.2 wt %, 4.5 wt %, 4.8 wt %, 5 wt %, 5.2 wt %, 5.5 wt %, 5.8 wt %, 6 wt %, 6.2 wt %, 6.5 wt %, 6.8 wt %, 7 wt %, 7.2 wt %, 7.5 wt %, 7.8 wt %, 8 wt %, 10 wt %, 12 wt %, 15 wt %, 18 wt %, 20 wt %.

According to an exemplary embodiment of the present disclosure, the vinyl-functionalized polysiloxane comprises 0.01 to 20 wt % $ViR^1SiO_{2/2}$, based on the total weight of the vinyl-functionalized polysiloxane, such as 0.1-18 wt %, or 0.5-16 wt %, or 1-15 wt %, or 1.5-12 wt %, or 2-10 wt %, or 2.2-8 wt %, or 2.5-5 wt %; for example, the content of the $ViR^1SiO_{2/2}$ unit can be within a numerical range obtained by combining any two of the following two end point values: 0.01 wt %, 0.05 wt %, 0.1 wt %, 0.15 wt %, 0.2 wt %, 0.25 wt %, 0.3 wt %, 0.35 wt %, 0.4 wt %, 0.45 wt %, 0.5 wt %, 0.55 wt %, 0.6 wt %, 0.65 wt %, 0.7 wt %, 0.75 wt %, 0.8 wt %, 0.85 wt %, 0.9 wt %, 0.95 wt %, 1 wt %, 1.2 wt %, 1.5 wt %, 1.8 wt %, 2 wt %, 2.2 wt %, 2.5 wt %, 2.8 wt %, 3 wt %, 3.2 wt %, 3.5 wt %, 3.8 wt %, 4 wt %, 4.2 wt %, 4.5 wt %, 4.8 wt %, 5 wt %, 5.2 wt %, 5.5 wt %, 5.8 wt %, 6 wt %, 6.2 wt %, 6.5 wt %, 6.8 wt %, 7 wt %, 7.2 wt %, 7.5 wt %, 7.8 wt %, 8 wt %, 10 wt %, 12 wt %, 15 wt %, 18 wt %, 20 wt %.

According to another embodiment of the present disclosure, each of $SiO_{4/2}$, $R^3SiO_{3/2}$, $(R^4)_2SiO_{2/2}$ and $R^5SiO_{1/2}$ may have a content of e.g. from 0 wt % to 100 wt %, or 2-95 wt %, or 5-90 wt %, or 8-85 wt %, or 10-80 wt %, or 15-75 wt %, or 20-70 wt %, or 25-65 wt %, or 30-60 wt %, or 35-55 wt %, or 40-50 wt %, or 45-48 wt %, based on the total weight of the vinyl-functionalized polysiloxane.

According to an exemplary embodiment of the present disclosure, the vinyl-functionalized polysiloxane can be represented by general formula (1):

$$[Vi(R^2)_2SiO_{1/2}]_m—(SiO_{4/2})_n—(R^3SiO_{3/2})_p—[(R^4)_2SiO_{2/2}]_q—[(R^5)_3SiO_{1/2}]_r \quad \text{Formula (1)}$$

wherein each of the subscripts m, n, p, q and r is independently an integer of 0 to 500, such as 1 to 400, or 2 to 300, or within a numerical range obtained by combining any two of the following two end point values: 0, 1, 2, 3, 4, 5, 6, 7, 8, 9, 10, 12, 15, 18, 20, 22, 25, 30, 35, 40, 45, 50, 55, 60, 70, 80, 90, 100, 110, 120, 130, 140, 150, 160, 170, 180, 190, 200, 220, 250, 300, 350, 400, 450, 500; for example, the subscript m can be an integer of 1 to 100, each of the subscripts n, p, q and r is independently an integer of 0 to 500, and 3≤n+p+q+r≤2000. According to another embodiment, none of $R^1$, $R^2$, $R^3$, $R^4$ and $R^5$ is hydrogen.

According to another embodiment of the present disclosure, the vinyl-functionalized polysiloxane is represented by general formula (2):

$$(ViMe_2SiO_{1/2})_m—(SiO_{4/2})_n-(Me^3SiO_{3/2})_p—[Me_2SiO_{2/2}]_q—[Me_3SiO_{1/2}]_r \quad \text{Formula (2)}$$

wherein each of the subscripts m, n, p, q and r is as defined above.

According to an embodiment of the present disclosure, the vinyl-functionalized polysiloxane has a viscosity of about 80 to 2000 mPa·s at 25 °C, such as 100-1500 mPa·s, or 120-1200 mPa·s, or 150-1000 mPa·s, or 200-800 mPa·s, or 220-600 mPa·s, or 250-400 mPa·s, or 280-350 mPa·s, or within a numerical range obtained by combining any two of the following two end point values: 80 mPa·s, 100 mPa·s, 120 mPa·s, 150 mPa·s, 180 mPa·s, 200 mPa·s, 220 mPa·s, 250 mPa·s, 280 mPa·s, 300 mPa·s, 320 mPa·s, 350 mPa·s, 380 mPa·s, 400 mPa·s, 420 mPa·s, 450 mPa·s, 500 mPa·s, 550 mPa·s, 600 mPa·s, 650 mPa·s, 700 mPa·s, 750 mPa·s, 800 mPa·s, 850 mPa·s, 900 mPa·s, 950 mPa·s, 1000 mPa·s, 1050 mPa·s, 1100 mPa·s, 1150 mPa·s, 1200 mPa·s, 1250 mPa·s, 1300 mPa·s, 1350 mPa·s, 1400 mPa·s, 1450 mPa·s, 1500 mPa·s, 1550 mPa·s, 1600 mPa·s, 1650 mPa·s, 1700 mPa·s, 1750 mPa·s, 1800 mPa·s, 1850 mPa·s, 1900 mPa·s, 1950 mPa·s, 2000 mPa·s.

As used herein, all the viscosities were reported in milliPascal*seconds (mPa·s) unless otherwise stated, and were measured by using a cone-plate rheometer with a CP #52 spindle at a speed of 0.1 revolutions per minute (0.2 $s^{-1}$ shear rate) for determining low shear viscosity and at 10 revolutions per minute (20 $s^{-1}$ shear rate) for determining high shear viscosity.

According to an embodiment of the present disclosure, the content of the vinyl-functionalized polysiloxane can be from 80 wt % to 99 wt %, based on the total weight of the first formulation, such as 82-98.5 wt %, or 85-98 wt %, or 87-97.5 wt %, or 88-97 wt %, or 90-96.5 wt %, or 92-96 wt %, or within a numerical range obtained by combining any two of the following two end point values: 80 wt %, 82 wt %, 85 wt %, 88 wt %, 90 wt %, 92 wt %, 93 wt %, 94 wt %, 95 wt %, 96 wt %, 97 wt %, 98 wt %, 99 wt %.

According to an embodiment of the present disclosure, the non-vinyl polysiloxane can be represented by general Formula (3):

$$[(R^6)_3SiO_{1/2}]_a—(SiO_{4/2})_b—(R^7SiO_{3/2})_c—[(R^8)_2SiO_{2/2}]_d \quad \text{Formula (3)}$$

wherein each of $R^6$, $R^7$ and $R^8$ is independently selected from the group consisting of H, $C_1$-$C_{16}$ alkyl group and $C_1$-$C_{16}$ alkoxy group, and combinations thereof; according to an exemplary embodiment, each of $R^6$, $R^7$ and $R^8$ is independently $C_1$-$C_6$ alkyl group, such as methyl, ethyl, n-propyl, i-propyl, n-butyl, i-butyl, s-butyl, t-butyl, etc., or $C_1$-$C_6$ alkoxy group, such as methoxy, ethoxy, propoxy, butoxy, etc.; each of the subscripts a, b, c and d is independently an integer of 0 to 300, such as 1 to 200, or 2 to 280, or within a numerical range obtained by combining any two of the following two end point values: 0, 1, 2, 3, 4, 5, 6, 7, 8, 9, 10, 12, 15, 18, 20, 22, 25, 30, 35, 40, 45, 50, 55, 60, 70, 80, 90, 100, 110, 120, 130, 140, 150, 160, 170, 180, 190, 200, 220, 250, 300; for example, the subscript a can be an integer of 1 to 100, or 2-50, each of the subscripts b, c and d is independently an integer of 0 to 200, and $3 \le a+b+c+d \le 800$. According to an embodiment, the non-vinyl polysiloxane is terminated with the "$(R^6)_3SiO_{1/2}$" unit.

According to another embodiment of the present disclosure, the non-vinyl polysiloxane is represented by Formula (4):

$$[(Me)_3SiO_{1/2}]_a—(SiO_{4/2})_b-(MeSiO_{3/2})_c—[(Me)_2SiO_{2/2}]_d \quad \text{Formula (4)}$$

wherein each of the subscripts a, b, c and d is as defined above.

According to an embodiment of the present disclosure, the non-vinyl polysiloxane has a viscosity of about 5 to 100 mPa·s at 25 °C, such as 8-90 mPa·s, or 10-85 mPa·s, or 12-80 mPa·s, or 15-70 mPa·s, or 16-60 mPa·s, or 17-50 mPa·s, or 18-40 mPa·s, or 20-30 mPa·s, or within a numerical range obtained by combining any two of the following two end point values: 5 mPa·s, 8 mPa·s, 10 mPa·s, 12 mPa·s, 15 mPa·s, 20 mPa·s, 25 mPa·s, 30 mPa·s, 35 mPa·s, 40 mPa·s, 45 mPa·s, 50 mPa·s, 55 mPa·s, 60 mPa·s, 65 mPa·s, 70 mPa·s, 75 mPa·s, 80 mPa·s, 90 mPa·s, 95 mPa·s, 100 mPa·s.

According to an embodiment of the present disclosure, the content of the non-vinyl polysiloxane can be from 0.05 wt % to 10 wt %, based on the total weight of the first formulation, such as 0.1-8 wt %, or 0.5-7 wt %, or 0.8-6 wt %, or 1-5 wt %, or 1.2-4 wt %, or 1.5-3 wt %, or 2.5-3 wt %, or within a numerical range obtained by combining any two of the following two end point values: 0.05 wt %, 0.08 wt %, 0.1 wt %, 0.2 wt %, 0.3 wt %, 0.5 wt %, 0.8 wt %, 0.9 wt %, 1 wt %, 1.1 wt %, 1.2 wt %, 1.3 wt %, 1.4 wt %, 1.5 wt %, 1.6 wt %, 1.7 wt %, 1.8 wt %, 1.9 wt %, 2 wt %, 2.1 wt %, 2.2 wt %, 2.3 wt %, 2.5 wt %, 2.6 wt %, 2.7 wt %, 2.8 wt %, 2.9 wt %, 3 wt %, 3.2 wt %, 3.5 wt %, 3.8 wt %, 4 wt %, 4.2 wt %, 4.5 wt %, 4.8 wt %, 5 wt %, 5.2 wt %, 5.5 wt %, 5.8 wt %, 6 wt %, 6.2 wt %, 6.5 wt %, 6.8 wt %, 7 wt %, 7.2 wt %, 7.5 wt %, 7.8 wt %, 8 wt %, 8.2 wt %, 8.5 wt %, 8.8 wt %, 9 wt %, 9.2 wt %, 9.5 wt %, 9.8 wt %, 10 wt %.

According to an embodiment of the present disclosure, noble metal-siloxane complex catalyst comprises or consists of at least one noble metal and a siloxane ligand, wherein the noble metal can be selected from the group consisting of Pt, Pd, Ru, Rh, Os, Ir, Ag, alloys and mixtures thereof, and the siloxane ligand can be a mono-siloxane, disiloxane, trisiloxane or tetrasiloxane optionally comprising one or more substituting groups such as hydrogen, $C_1$-$C_{16}$ alkyl, $C_1$-$C_{16}$ alkoxy, $C_2$-$C_{16}$ alkenyl. For example, the siloxane ligand may comprise more than one $C_2$-$C_{16}$ alkenyl (e.g. vinyl) and more than one $C_1$-$C_{16}$ alkyl, such as divinyl-tetramethyldisiloxane, especially 1,3-divinyl-1,1,3,3-tetramethyldisiloxane.

According to another embodiment of the present disclosure, the noble metal-siloxane complex catalyst can be used in the form a dispersion comprising the above indicated noble metal-siloxane complex catalyst dispersed in a polysiloxane dispersing agent, wherein the polysiloxane dispersing agent can be represented by Formula (5)

$$[Vi(R^9)_2SiO_{1/2}]_A—(SiO_{4/2})_B—(R^{10}SiO_{3/2})_C—[(R^{11})_2SiO_{2/2}]_D—[(R^{12})_3SiO_{1/2}]_E \quad \text{Formula (5)}$$

wherein each of $R^9$, $R^{10}$, $R^{11}$ and $R^{12}$ is independently selected from the group consisting of H, $C_1$-$C_{16}$ alkyl group and $C_1$-$C_{16}$ alkoxy group, and combinations thereof; according to an exemplary embodiment, each of $R^9$, $R^{10}$, $R^{11}$ and $R^{12}$ is independently $C_1$-$C_6$ alkyl group, such as methyl, ethyl, n-propyl, i-propyl, n-butyl, i-butyl, s-butyl, t-butyl, etc., or $C_1$-$C_6$ alkoxy group, such as methoxy, ethoxy, propoxy, butoxy, etc. According to another embodiment, none of $R^9$, $R^{10}$, $R^{11}$ and $R^{12}$ is hydrogen. each of the subscripts A, B, C, D and E is independently an integer of 0 to 500, such as 1 to 400, or 2 to 300, or within a numerical range obtained by combining any two of the following two end point values: 0, 1, 2, 3, 4, 5, 6, 7, 8, 9, 10, 12, 15, 18, 20, 22, 25, 30, 35, 40, 45, 50, 55, 60, 70, 80, 90, 100, 110, 120, 130, 140, 150, 160, 170, 180, 190, 200, 220, 250, 300, 350, 400, 450, 500; for example, the subscript A can be an integer of 1 to 100, each of the subscripts B, C, D and E is independently an integer of 0 to 500, and $3 \leq B+C+D+E \leq 2000$.

According to another embodiment of the present disclosure, the polysiloxane dispersing agent is represented by Formula (6):

$$[ViMeSiO_{1/2}]_A\text{—}(SiO_{4/2})_B\text{-}(MeSiO_{3/2})_C\text{—}[Me_2SiO_{2/2}]_D\text{—}[Me_2SiO_{1/2}]_E \quad \text{Formula (6)}$$

wherein each of the subscripts A, B, C, D and E is as defined above.

According to another embodiment of the present disclosure, the dispersion comprises the above indicated noble metal-siloxane complex catalyst and the polysiloxane dispersing agent, wherein the content of the noble metal-siloxane complex catalyst can be from 0.01 wt % to 15 wt %, based on the total weight of the dispersion, such as 0.1-12 wt %, or 0.5-10 wt %, or 0.8-8 wt %, or 1-7 wt %, or 1.2-6 wt %, or 1.3-5 wt %, or 1.5-3 wt %, or within a numerical range obtained by combining any two of the following two end point values: 0.01 wt %, 0.02 wt %, 0.05 wt %, 0.08 wt %, 0.1 wt %, 0.2 wt %, 0.3 wt %, 0.5 wt %, 0.8 wt %, 0.9 wt %, 1 wt %, 1.1 wt %, 1.2 wt %, 1.3 wt %, 1.4 wt %, 1.5 wt %, 1.6 wt %, 1.7 wt %, 1.8 wt %, 1.9 wt %, 2 wt %, 2.1 wt %, 2.2 wt %, 2.3 wt %, 2.5 wt %, 2.6 wt %, 2.7 wt %, 2.8 wt %, 2.9 wt %, 3 wt %, 3.2 wt %, 3.5 wt %, 3.8 wt %, 4 wt %, 4.2 wt %, 4.5 wt %, 4.8 wt %, 5 wt %, 5.2 wt %, 5.5 wt %, 5.8 wt %, 6 wt %, 6.2 wt %, 6.5 wt %, 6.8 wt %, 7 wt %, 7.2 wt %, 7.5 wt %, 7.8 wt %, 8 wt %, 8.2 wt %, 8.5 wt %, 8.8 wt %, 9 wt %, 9.2 wt %, 9.5 wt %, 9.8 wt %, 10 wt %, 11 wt %, 12 wt %, 13 wt %, 14 wt %, 15 wt %. According to an embodiment of the present disclosure, the dispersion of catalyst has a viscosity of about 100 to 3000 mPa·s at 25 °C, such as 150-2500 mPa·s, or 180-2200 mPa·s, or 200-2000 mPa·s, or 220-1800 mPa·s, or 250-1500 mPa·s, or 280-1200 mPa·s, or 300-1000 mPa·s, or 400-500 mPa·s, or within a numerical range obtained by combining any two of the following two end point values: 100 mPa·s, 120 mPa·s, 150 mPa·s, 180 mPa·s, 200 mPa·s, 220 mPa·s, 250 mPa·s, 280 mPa·s, 300 mPa·s, 320 mPa·s, 350 mPa·s, 380 mPa·s, 400 mPa·s, 800 mPa·s, 850 mPa·s, 900 mPa·s, 950 mPa·s, 1000 mPa·s, 1050 mPa·s, 1100 mPa·s, 1150 mPa·s, 1200 mPa·s, 1250 mPa·s, 1300 mPa·s, 1350 mPa·s, 1400 mPa·s, 1450 mPa·s, 1500 mPa·s, 1550 mPa·s, 1600 mPa·s, 1650 mPa·s, 1700 mPa·s, 1750 mPa·s, 1800 mPa·s, 1850 mPa·s, 1900 mPa·s, 1950 mPa·s, 2000 mPa·s, 2200 mPa·s, 2500 mPa·s, 2800 mPa·s, 3000 mPa·s.

According to another embodiment of the present disclosure, the amount of the above indicated dispersion (of catalyst) can be 0.05 wt % to 10 wt %, based on the total weight of the first formulation, such as 0.1-8 wt %, or 0.5-7 wt %, or 0.8-6 wt %, or 1-5 wt %, or 1.2-4 wt %, or 1.5-3 wt %, or within a numerical range obtained by combining any two of the following two end point values: 0.05 wt %, 0.08 wt %, 0.1 wt %, 0.2 wt %, 0.3 wt %, 0.5 wt %, 0.8 wt %, 0.9 wt %, 1 wt %, 1.1 wt %, 1.2 wt %, 1.3 wt %, 1.4 wt %, 1.5 wt %, 1.6 wt %, 1.7 wt %, 1.8 wt %, 1.9 wt %, 2 wt %, 2.1 wt %, 2.2 wt %, 2.3 wt %, 2.5 wt %, 2.6 wt %, 2.7 wt %, 2.8 wt %, 2.9 wt %, 3 wt %, 3.2 wt %, 3.5 wt %, 3.8 wt %, 4 wt %, 4.2 wt %, 4.5 wt %, 4.8 wt %, 5 wt %, 5.2 wt %, 5.5 wt %, 5.8 wt %, 6 wt %, 6.2 wt %, 6.5 wt %, 6.8 wt %, 7 wt %, 7.2 wt %, 7.5 wt %, 7.8 wt %, 8 wt %, 8.2 wt %, 8.5 wt %, 8.8 wt %, 9 wt %, 9.2 wt %, 9.5 wt %, 9.8 wt %, 10 wt %.

According to another embodiment of the present disclosure, the first formulation is solventless. As used herein, the term "solventless" means that no solvent, such as water and any ordinary organic solvents (e.g. alkane, halogenated hydrocarbon, ether, alcohol, ester, aromatic hydrocarbon, ketone, tetrahydrofuran, dimethylformamide, N-methylpyrrolidone, carbon bisulfide, etc.) is intentionally incorporated therein, and a formulation comprising trace amount of these solvents as inevitable impurities (e.g. as impurities contained in the raw materials) is also considered as solventless. For example, the solventless first formulation may has a solvent content of less than 1 wt %, based on the total weight of the first formulation, such as less than 0.9 wt %, or less than 0.8 wt %, or less than 0.7 wt %, or less than 0.6 wt %, or less than 0.5 wt %, or less than 0.4 wt %, or less than 0.3 wt %, or less than 0.25 wt %, or less than 0.2 wt %. According to an embodiment of the present disclosure, the vinyl-functionalized polysiloxane, the non-vinyl polysiloxane, and the one noble metal-siloxane complex catalyst (and the above indicated dispersion comprising the noble metal-siloxane complex catalyst) are solventless.

The first formulation may optionally comprise one or more conventional additives such as filler, pigment, film-forming agent, thickener, anti-migration aid, curing agent, coalescent, lubricant, flame retardant, light stabilizer, heat stabilizer, biocide, plasticizer, wax or anti-oxidant.

The Formulation (B)

The formulation (B) is an aqueous dispersion comprising at least one olefin (co)polymer and at least one olefin-(meth) acrylic copolymer.

The olefin (co)polymer can be a homopolymer of a $C_2$-$C_{16}$ alkene, a copolymer of two or more $C_2$-$C_{16}$ alkenes, or a copolymer of at least one $C_2$-$C_{16}$ alkenes with at least one vinyl comonomer other than olefin. For example, the olefin (co)polymer can be a copolymer of ethylene with one or more $C_3$-$C_{16}$ α-alkene, such as 1-propylene, 1-butene, 1-pentene, 1-hexene, 1-heptene, 1-octene, 1-nonene, 1-decene, 1-dodecene, butadiene, styrene, etc. In such a ethylene-($C_3$-$C_{16}$) α-alkene copolymer, the molar ratio between the ethylene and the ($C_3$-$C_{16}$) α-alkene can be 99:1 to 1:99, such as within a numerical range obtained by combining any two of the following two end point values: 95:1, 90:1, 85:1, 80:1, 75:1, 70:1, 65:1, 60:1, 55:1, 50:1, 45:1, 40:1, 35:1, 30:1, 25:1, 20:1, 15:1, 10:1, 5:1, 3:1, 2:1, 1:1, 1:2, 1:3, 1:5, 1:10, 1:15, 1:20, 1:25, 1:30, 1:35, 1:40, 1:45, 1:50, 1:55, 1:60, 1:65, 1:70, 1:80, 1:90. The olefin (co)polymer may have a melt flow rate (MFR) in the range of from 0.1 to 50 g/10 minutes, measured in accordance with ASTM D-1238 (at 190 °C/2.16 Kg), such as 0.1 to 50, or 0.2 to 45, or 0.5 to 45, or 0.5 to 40, or 0.5 to 35, or 0.8 to 35, or 1 to 35, or 2 to 35. The content of the olefin (co)polymer can be 10-50 wt %, based on the total weight of the formulation (B), such as 15-45 wt %, or 20-40 wt %, or 25-35 wt %, or 28-32 wt %, such as within a numerical range obtained by combining any two of the following two end point values: 10 wt %, 12 wt %, 14 wt %, 15 wt %, 18 wt %, 20 wt %, 22 wt %, 25 wt %, 28 wt %, 30 wt %, 32 wt %, 34 wt %, 35 wt %, 38 wt %, 40 wt %, 42 wt %, 45 wt %, 48 wt %, 50 wt %.

The olefin-(meth)acrylic copolymer can be a copolymer of at least one $C_2$-$C_{16}$ alkene with at least one (meth)acrylic monomer, wherein the $C_2$-$C_{16}$ alkene may comprise $C_2$-$C_{12}$ alkene or $C_2$-$C_6$ alkene, such as ethylene, propylene, butene, pentene, hexene, heptene, octene, nonene or styrene; the (meth)acrylic monomer may comprise methacrylic acid, acrylic acid, methacrylamide, acrylamide, methacrylonitrile, acrylonitrile, ($C_1$-$C_{12}$)alkyl methacrylate (e.g. methyl methacrylate, ethyl methacrylate, propyl methacrylate, butyl methacrylate, pentyl methacrylate, hexyl methacrylate, etc.), ($C_1$-$C_{12}$)alkyl acrylate (e.g. methyl acrylate, ethyl acrylate, propyl acrylate, butyl acrylate, pentyl acrylate, hexyl acrylate, etc.), and any combinations thereof. The molar ratio between the olefin and the (meth)acrylic monomer can be 99:1 to 1:99, such as within a numerical range obtained by combining any two of the following two end point values: 95:1, 90:1, 85:1, 80:1, 75:1, 70:1, 65:1, 60:1, 55:1, 50:1, 45:1, 40:1, 35:1, 30:1, 25:1, 20:1, 15:1, 10:1, 5:1, 3:1, 2:1, 1:1, 1:2, 1:3, 1:5, 1:10, 1:15, 1:20, 1:25, 1:30, 1:35, 1:40, 1:45, 1:50, 1:55, 1:60, 1:65, 1:70, 1:80, 1:90. The olefin-(meth)acrylic copolymer may have a melt flow rate (MFR) in the range of from 0.1 to 50 g/10 minutes, measured in accordance with ASTM D-1238 (at 190 °C/2.16 Kg), such as 0.1 to 50, or 0.2 to 45, or 0.5 to 45, or 0.5 to 40, or 0.5 to 35, or 0.8 to 35, or 1 to 35, or 2 to 35. The content of the olefin-(meth)acrylic copolymer can be 2-30 wt %, based on the total weight of the formulation (B), such as 5-28 wt %, or 8-25 wt %, or 10-20 wt %, or 12-15 wt %, such as within a numerical range obtained by combining any two of the following two end point values: 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 20 wt %, 22 wt %, 25 wt %, 28 wt %, 30 wt %.

The formulation (B) may comprise one or more one or more conventional additives such as surfactant, emulsifier, filler, film-forming agent, colorant, pigment, thickener, anti-migration aid, curing agent, coalescent, biocide, plasticizer, wax, anti-aging agent or anti-oxidant.

Besides, in addition to the above stated components, the formulation (B) may comprises balance amount of water, such as having a water content of about 30 wt % to 75 wt %, or 40-65 wt %, or 45-60 wt %, or 50-58 wt %, based on the total weight of the formulation (B), such as within a numerical range obtained by combining any two of the following two end point values: 30 wt %, 32 wt %, 35 wt %, 38 wt %, 40 wt %, 42 wt %, 45 wt %, 48 wt %, 50 wt %, 52 wt %, 55 wt %, 58 wt %, 60 wt %, 62 wt %, 65 wt %, 68 wt %, 70 wt %, 72 wt %, 75 wt %.

The above indicated formulation (A) and formulation (B) can be independently used for forming separate components of the release liner of the present disclosure. FIG. 1 shows the cross-section of an exemplary release liner comprising, from bottom to top, a backing layer, an intermediate layer and a release layer, wherein the intermediate layer is formed with the formulation (B), and the release layer is formed with the formulation (A).

According to an embodiment of the present disclosure, the backing layer can be made from a material selected from the group consisting of paper, e.g. Kraft paper, coated Kraft paper, pressure-sensitive paper, cellophane, coated cellophane, gummed paper, recycled paper, etc.; degradable polymeric or natural material such as polylactic acid, polybutene succinate/caproate, polyhydroxybutyrate/valerate, polyvinyl succinate, polycaprolactone, starch, modified cellulose; and any combinations thereof. According to another embodiment, the backing layer can be made of Kraft paper. According to a preferable embodiment of the present disclosure, the backing layer is not made of a non-repulpable material. For example, the polyethylene coated Kraft (PEK) paper, which is generally used as the backing layer or release liner after siliconized on PE coated side in various adhesive tape or label products, cannot achieve desirable repulpability and thus is completely unsuitable for the backing layer of the present disclosure.

According to an embodiment of the present disclosure, the backing layer is repulpable. As used herein, the term “repulpable” or “repulpability” means that an object can be sufficiently degraded and disintegrated under ordinary pulping (disintegration) condition (e.g. treatment in a stirred warm aqueous solution under specific pH) so as to minimize the content of remaining large fragments and debris (e.g. those having a size larger than 0.01 inch or about 0.254 mm) to a level of e.g. less than 14 wt %, or less than 12 wt %, or less than 10 wt %, or less than 8 wt %, or less than 6 wt %, based on the original weight (solid weight) of the object before the repulping treatment. According to an embodiment of the present disclosure, all of the release layer, the intermediate layer and the backing layer are repulpable. According to another embodiment of the present disclosure, the whole release liner is repulpable.

As shown in FIG. 1, the release liner can be prepared by applying the formulation (B) onto one or both surfaces of the backing layer by any proper coating technologies such as gravure coating, roll coating, bar coating, knife coating, cast coating, spray coating, dip coating, die coating, blade coating, printing, etc., and the coating weight of this layer can be about 1 to 30 g/m$^2$, such as 2-20 g/m$^2$, or 2-10 g/m$^2$, or 2-5 g/m$^2$. Then coated layer can be cured at a temperature from the ambient temperature to 200 °C, such as 50-180 °C, or 60-160 °C, or 80-150 °C, or 90-130 °C, or 100-130 °C. After the curing and drying of the intermediate layer, a release layer can be formed on the surface of the intermediate layer by combining every ingredients of the formulation (A) to form a blend (e.g. a paste), and coating this blend, by any of the above indicated coating technologies, onto the exterior surface of the intermediate layer, and the coating weight of the release layer (wet) can be about 0.5 to 20 g/m$^2$, such as 0.5-15 g/m$^2$, or 0.5-10 g/m$^2$, or 0.8-10 g/m$^2$. Then coated release layer can be cured at a temperature of from the ambient temperature to 200 °C, such as 50-180 °C, or 60-170 °C, or 80-160 °C, or 100-150 °C, or 120-150 °C.

Figure 2:
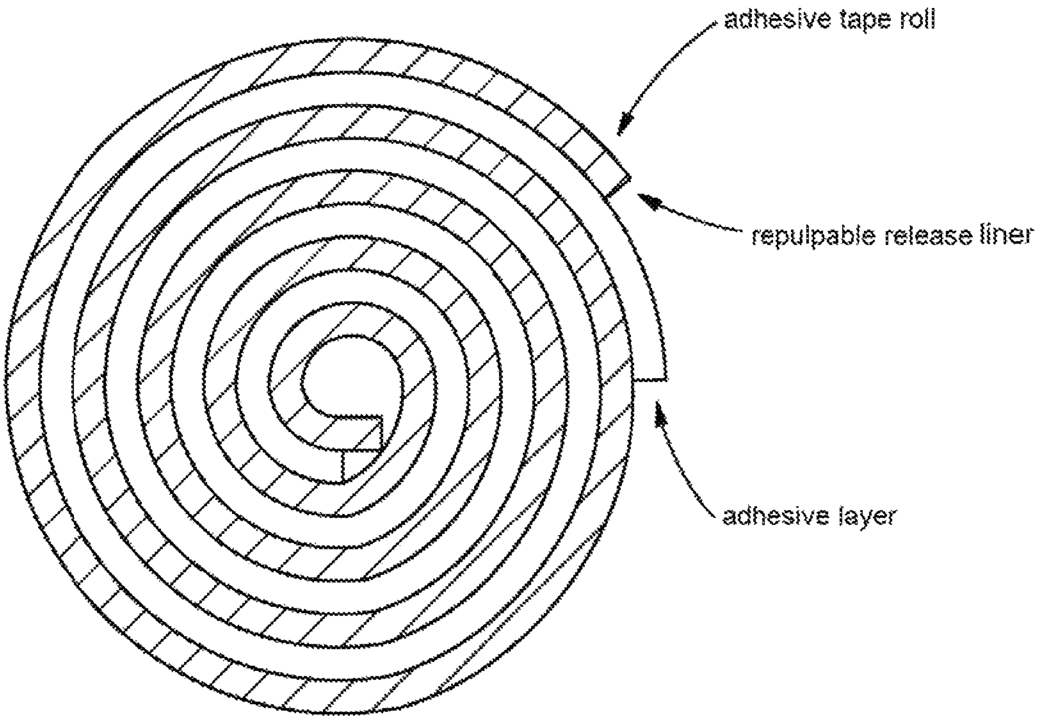
FIG. 2 is a schematic cross-section of an adhesive tape roll prepared by using the release liner according to an embodiment of the present disclosure.

The release liner may be sliced into different sizes and used for different applications, such as separated pieces of adhesive sheet or continuous adhesive tape. FIG. 2 shows the schematic view of a continuous adhesive tape in the form of a roll, wherein a laminate formed by the release liner and an adhesive layer is wound into a roll. The adhesive tape roll can be unwound for specific use, and the release liner can be readily peeled off before or after the bonding of the adhesive layer onto the surface of an object. The peeled release liner has superior repulpability and thus can be readily repulped and recycled.

Figure 3:
FIG. 3 is a schematic cross-section of a different kind of adhesive tape/label according to another embodiment of the present disclosure.

FIG. 3 illustrates a label or a tape comprising an adhesive layer sandwiched between a release liner of the present invention and a carrier layer, wherein the adhesion strength between the carrier layer and the adhesive layer is much higher, and these two layers are applied as a whole onto the surface of an object while the release liner is peeled off beforehand and repulped. The carrier layer may have printed image, letter or symbol.

EXAMPLES

Some embodiments of the invention will now be described in the following Examples, wherein all parts and percentages are by weight unless otherwise specified. However, the scope of the present disclosure is not, of course, limited to the formulations set forth in these examples. Rather, the Examples are merely inventive of the disclosure.

The information of the raw materials used in the examples is listed in the following table 1:

TABLE 1

Raw materials used in the examples

| Raw Material | Characterization | Vendor |
|---|---|---|
| SYL-OFF ™ SL 200 | Solventless vinyl-functionalized polysiloxane with a viscosity of 350 mPa · s at 25° C. and a vinyl content of 0.65 wt % | Dow Chemical Company |
| SYL-OFF ™ 7920NF | Aqueous dispersion of vinyl-functionalized polysiloxane and non-vinyl polysiloxane with 40 wt % solid content | Dow Chemical Company |
| SYL-OFF ™ SL 7028 | Non-vinyl polysiloxane with a viscosity of 20 mPa · s at 25° C. | Dow Chemical Company |
| SYL-OFF ™ 7682-055 | Non-vinyl polysiloxane with a viscosity of 35 mPa · s at 25° C. | Dow Chemical Company |
| SYL-OFF ™ 297 | Alkoxy containing alkenyl/epoxy functionalized organopolysiloxane | Dow Chemical Company |
| SYL-OFF ™ 4000 | Pt-siloxane complex catalyst dispersed in vinyl-functionalized polysiloxane with a viscosity of 450 mPa · s at 25° C. | Dow Chemical Company |
| SYL-OFF ™ EM 7975 | 40 wt % aqueous dispersion of Pt-siloxane complex catalyst in vinyl-functionalized polysiloxane | Dow Chemical Company |
| Acrysol ™ RM-2020 | Urethane-type thickener | Dow Chemical Company |
| DOWSIL ™ 5211 | Hydroxyl-functionalized trisiloxane wetting agent | Dow Chemical Company |
| Hypod ™ 8501 | Aqueous dispersion comprising olefin copolymer and olefin-acrylic copolymer | Dow Chemical Company |
| Rhobarr ™ 320 | Aqueous dispersion comprising olefin copolymer and olefin-acrylic copolymer | Dow Chemical Company |

Example 1

In this example, a piece of 297 mm×210 mm Kraft paper having a basis weight of 70 g/m$^2$ was used as the backing layer, Hypod 8501 was directly coated, by using a Meyer bar, onto the surface of the backing layer to a target coating weight of 5 g/m$^2$, then the coated Kraft paper was heated in a Mathis oven under a temperature of 130 °C for 3 minutes, to form the intermediate layer on the backing layer. 2.8 g non-vinyl polysiloxane (SYL-OFF IM SL 7028) was slowly added into 100 g solventless vinyl-functionalized polysiloxane (SYL-OFF™ SL 200) under vigorous stirring, and then adding 1.5 g Pt-siloxane complex catalyst SYL-OFF™ 4000 under vigorous stirring. The mixture thus formed was applied on the exterior surface of the intermediate layer by using a Meyer bar, and then heated in an oven at 120 °C for 30 seconds, thus forming a release layer with a dry coating weight of 2 g/m$^2$.

Examples 2-3

In these examples, the procedures of Example 1 were repeated, expected that the formulation for the release layer was changed according to those shown in Table 2.

Comparative Example 1

Comparative Example 1 provides a piece of 297 mm×210 mm uncoated Kraft paper.

Comparative Example 2

In this comparative example, 10 μm PE coating layer was coated (by extrusion coating technology) onto the surface of a piece of 297 mm×210 mm Kraft paper to produce a PEK (PE coated Kraft paper). The PEK has been widely used in the prior art as the backing layer or release liner in many commercialized products such as adhesive tape or adhesive label, and thus is used in Comparative Examples 2 and 3 for illustrating the technical effect of the inventive examples.

Comparative Example 3

In Comparative Example 3, 2.8 g non-vinyl polysiloxane (SYL-OFF IM SL 7028) was slowly added into 100 g solventless vinyl-functionalized polysiloxane (SYL-OFF™ SL 200) under vigorous stirring, and then adding 1.5 g Pt-siloxane complex catalyst SYL-OFF™ 4000 under vigorous stirring. The mixture thus formed was applied on the exterior surface of the PEK by using a Meyer bar, and then heated in an oven at 120 °C for 30 seconds, thus forming a release layer with a dry coating weight of 2 g/m$^2$.

Comparative Example 4

In Comparative Example 4, a piece of 297 mm×210 mm PEK prepared by Comparative Document 2 was used as the backing layer, Hypod 8501 was directly coated, by using a Meyer bar, onto the surface of the backing layer to a target coating weight of 5 g/m$^2$, then the coated PEK was heated in a Mathis oven under a temperature of 130 °C for 3 minutes. No release layer was applied.

Comparative Examples 5-15

In these examples, the procedures of Example 1 were repeated, expected that the formulation for the release layer was changed according to those shown in Table 2, and all the release layer had a dry coating weight of 2 g/m$^2$.

TABLE 2

Formulations for Examples (Ex.) 1-3 and Comparative Example (Co. Ex.)1-15

| | Backing layer | Intermediate layer Hypod ™ 8501 | Rhobarr ™ 320 | release layer Raw materials | Ratio by weight | Coatability |
|---|---|---|---|---|---|---|
| Ex. 1 | Kraft paper | 5 g/m$^2$ | — | SL200/7028/4000 | 100/2.8/1.5 | Pass |
| Ex. 2 | Kraft paper | 5 g/m$^2$ | — | SL200/7028/4000 | 100/2.4/1.6 | Pass |
| Ex. 3 | Kraft paper | 5 g/m$^2$ | — | SL200/7028/4000 | 100/3.2/1.5 | Pass |
| Co. Ex. 1 | Kraft paper | — | — | — | — | — |
| Co. Ex. 2 | PEK | — | — | — | — | — |
| Co. Ex. 3 | PEK | — | — | SL200/7028/4000 | 100/2.8/1.5 | — |
| Co. Ex. 4 | Kraft paper | 5 | — | — | — | — |
| Co. Ex. 5 | Kraft paper | 5 | — | 7920NF/water/297/7975 | 100/400/0.4/17.6 | Failed |
| Co. Ex. 6 | Kraft paper | — | 5 | 7920NF/water/297/7975 | 100/400/0.4/17.6 | Failed |
| Co. Ex. 7 | Kraft paper | 5 | — | 7920NF/water/297/7975/5211 | 100/400/0.4/17.6/0.056 | Failed |
| Co. Ex. 8 | Kraft paper | — | 5 | 7920NF/water/297/7975/5211 | 100/400/0.4/17.6/0.056 | Failed |
| Co. Ex. 9 | Kraft paper | 5 | — | 7920NF/water/RM2020/7975 | 100/400/0.5/17.6 | Failed |
| Co. Ex. 10 | Kraft paper | — | 5 | 7920NF/water/RM2020/7975 | 100/400/0.5/17.6 | Failed |
| Co. Ex. 11 | Kraft paper | 5 | — | SL200/7682-055/4000 | 100/3.7/1.4 | Pass |
| Co. Ex. 12 | Kraft paper | — | 5 | SL200/7682-055/4000 | 100/3.7/1.4 | Failed |
| Co. Ex. 13 | Kraft paper | 5 | — | SL200/7682-055/4000 | 100/3.2/1.0 | Pass |
| Co. Ex. 14 | Kraft paper | — | 5 | SL200/7682-055/4000 | 100/3.2/1.0 | Failed |
| Co. Ex. 14 | Kraft paper | — | 5 | SL200/7028/4000 | 100/2.8/1.5 | Failed |

The release liner prepared in the above indicated inventive examples and comparative examples were characterized by the following technologies.

Coatability

The coatability of inventive examples 1-3 and comparative examples 3 and 4-15 were characterized by the following procedure: apply the bath of the formulation (A) on the paper (Kraft or PEK) with or without the intermediate layer as described in table 2. If the bath can be evenly distributed and form a thin film on the surface within 5 s, the coatability should be reported as "pass", otherwise the sample will be reported as "fail".

The characterization results summarized in Table 2 showed that only the inventive examples 1-3 and comparative examples 11 and 13 had good coatability, which represent good compatibility between the intermediate layer and the release layer. Comparative Documents 1-3 and 4 were not characterized since they did not have the release layer or did not have the intermediate layer.

As can be seen from the characterization results shown in Table 2, the release layers prepared with aqueous formulation represent poor compatibility with the intermediate layer, and the intermediate layers produced by using RHOBARR™ 320, which has a composition beyond the present disclosure, also exhibit poor compatibility. The comparative examples having poor coatability are not impractically usable, thus they were not subjected to further characterization.

Rub-Resistance

The rub-resistance properties of the Inventive Examples 1-3 and Comparative Examples 3, 11 and 13 were characterized by the following procedures:

Offline rub off by thumb: This test was conducted immediately after the preparation of the release liner. The release liner was rubbed with a clean thumb at the center part of the release layer with moderate force for 10 times, then the release layer was observed with naked eyes to check if there was any scattered powder thereon, and a straight line was drawn with a mark pen on the surface to reveal any difference between the rubbed area and the non-rubbed area. The sample exhibiting neither powder nor different appearance is given a "PASS" result, otherwise it will be reported as "FAILED".

Postcure rub off by thumb: The release liners prepared in the Inventive Examples 1-3 and Comparative Examples 3, 11 and 13 was aged at ambient temperature for two days, and then was rubbed with a clean thumb at the center part of the release layer with moderate force for 60 times, after which the release layer was observed with naked eyes to check if there was any scattered powder thereon, and a straight line was drawn with a mark pen on the surface to reveal any difference between the rubbed area and the non-rubbed area. The sample exhibiting neither powder nor different appearance is given a "PASS" result, otherwise it will be reported as "FAILED".

Rub off by machine: This test was conducted immediately after the preparation of the release liner. Three $30 mm samples were sliced from the release liner, and a blank sample (without the release layer) with the same dimension was also sliced. The release coating weight of the sample was measured with Oxford 8000 with the calibration of the blank sample, and the measured data was recorded as coating weight before rubbing (in g/m$^2$). The sample was fixed on a platen and rubbed with a rubbing head under the load of 1 kg for 30 cycles. Then the release coating weight was measured with Oxford 8000 again and recorded as coating weight before rubbing (in g/m$^2$). The retention ratio percentage (RO) can be calculated by the equation of $$\text{Retention ratio (\%)}-(\text{coating weight after rubbing}+\text{coating weight before rubbing})\times 100\%.$$

The measure for each example or comparative example was repeated three times, and the average results were summarized in the following Table 3.

Subsequent Adhesion Strength (SAS)

The SAS was characterized according to Finat Standard Test Method FTM 11.

In particular, a pressure-sensitive adhesion tape Nitto31B was laminated onto the release layer of the release liner, the laminated sample was pressed twice with a FINAT roller under a rolling rate of 10 mm/second. The sample was placed onto a glass and covered with a flat metal plate under a load of 20 g/cm$^2$, then it kept at a temperature of 70 °C for 20 hours to ensure the intimate contact between the adhesive and the release layer. The sample was taken out and held at ambient temperature for 1 hour. The Nitto31B adhesion tape was peeled from the release liner, laminated onto a PET film and pressed twice with a FINAT roller under a rolling rate of 10 mm/second. The laminate was held at ambient condition for 1.5 hours, after which the laminate was fixed onto an AR-1500 tensile testing machine and the peel strength was measured by peeling the sample at an angle of 180° under a jaw separation rate of 300 mm/minute. The above stated procedure was repeated three times and the average result was reported as the "average adhesion force on testing sample".

Besides, the above stated procedure was further repeated three times by laminating the Nitto31B adhesion tape onto a blank Teflon, and the average result was reported as the "average adhesion force on blank Teflon".

The SAS can be calculated by the equation of $$SAS(\%) = (\text{average adhesion force on testing sample} \div \text{average adhesion force on blank Teflon}) \times 100\%.$$

The SAS characterization results are summarized in Table 3.

Release Force

The release force was measured according to Finat Standard Test Method FTM 10

The release liners prepared in the above stated examples and comparative examples were kept at 23 °C or 70 °C for two days. A Tesa 7475 adhesive tape was laminated onto the release layer of the release liner, the laminated sample was pressed twice with a FINAT roller under a rolling rate of 10 mm/second. The sample was placed onto a glass and covered with a flat metal plate under a load of 20 g/cm$^2$, then it kept at a temperature of 70 °C for 20 hours to ensure the intimate contact between the adhesive and the release layer. The sample was taken out and held at ambient temperature for 1 hour, after which the laminate was fixed onto an AR-1500 tensile testing machine and the release force was measured by peeling the sample at an angle of 180° under a jaw separation rate of 300 mm/minute. The above stated procedure was repeated three times and the average result was reported as the "release force at 23 °C" or "release force at 70 °C" in g/inch.

TABLE 3

The rub-resistance and adhesion/releasing properties of Examples (Ex.) 1-3 and Comparative Example (Co. Ex.) 3, 11, 13

| | Ex. 1 | Ex. 2 | Ex. 3 | Co. Ex. 3 | Co. Ex. 11 | Co. Ex. 13 |
|---|---|---|---|---|---|---|
| Offline Rub Off by thumb | Pass | Pass | Pass | Pass | Pass | Pass |
| Postcure Rub Off by thumb | Pass | Pass | Pass | Pass | Failed | Failed |
| Rub off by machine Retention ratio (%) | 97.15 | 92.3 | 98.5 | 98.66 | 8.5 | 2.00 |
| SAS (%) | 95.5 | 90.5 | 96.3 | 94.4 | 92.3 | 94.3 |
| release force at 23° C. (g/inch) | 6.0 | 5.2 | 6.3 | 12.4 | 4.4 | 3.4 |
| release force at 70° C. (g/inch) | 13.0 | 11.8 | 15.6 | 22.6 | 15.3 | 18.6 |

As can be seen from the characterization results summarized in Table 3, all the inventive examples can exhibit superior rub-resistance, suitable adhesion/releasing properties two the adhesive tape and good anti-aging property over the comparative examples.

Repulpability

The repulpability of each release liner was measured by weighing 25 gram of the release liner sample and adding it into 2 liters water. The sample was blended and disintegrated with customary blender blade under a stirring rate of 3000 rpm and a temperature of 50 °C for 10 minutes. Then the dispersion was filtered through a screen mesh with a screen size of 0.010 inch. The solid residue captured on the screen was rinsed with small amount of DI water, dried at 60 °C for 2 hours, and weighed to calculate the percentage of insolube. The results were reported in Table 4 as Rejects %, wherein higher percentage value represents more insolube and poorer repulpability.

TABLE 4

The repulpability of Examples (Ex.) 1-3 and Comparative Examples 2-3, 11, 13.

| | Ex. 1 | Ex. 2 | Ex. 3 | Co. Ex. 2 | Co. Ex. 3 | Co. Ex. 11 | Co. Ex. 13 |
|---|---|---|---|---|---|---|---|
| Rejects (%) | 5.64 | 5.35 | 5.97 | 14.06 | 16.57 | 7.31 | 6.89 |

As can be seen from the results shown in Table 4, all the release liner prepared with the inventive examples 1-3 exhibit superior repulpability over the comparative examples.

Summing up the above, the present disclosure has developed formulations for the release layer and intermediate layer of the release liner, and the combination of these two layers have achieved superior repulpability, coatability as well as good mechanical properties such as rub-resistance, adhesion strength, release force, etc.

What is claimed is:

1. A combined composition for preparing repulpable release liner, comprising (A) a first formulation comprising a vinyl-functionalized polysiloxane, a non-vinyl polysiloxane, and a noble metal-siloxane complex catalyst; and (B) a second formulation comprising at least one olefin (co)polymer and at least one olefin-(meth)acrylic copolymer;

wherein the first formulation is independent from the second formulation.

2. The combined composition according to claim 1, wherein the first formulation is solventless.

3. The combined composition according to claim 1, wherein the vinyl-functionalized polysiloxane is represented by Formula (1):

$$[Vi(R^2)_2SiO_{1/2}]_m—(SiO_{4/2})_n—(R^3SiO_{3/2})_p—[(R^4)_2SiO_{2/2}]_q—[(R^5)_3SiO_{1/2}]_r \quad \text{Formula (1)}$$

wherein each of $R_2$, $R_3$, $R_4$ and $R_5$ is independently selected from the group consisting of H, $C_1$-$C_{16}$ alkyl group and $C_1$-$C_{16}$ alkoxy group, and combinations thereof, the subscript m is an integer of 1 to 100, each of the subscripts n, p, q and r is independently an integer of 0 to 500, and 3≤n+p+q+r≤2000.

4. The combined composition according to claim 1, wherein the non-vinyl polysiloxane is represented by Formula (3):

$$[(R_6)_3SiO_{1/2}]_a—(SiO_{4/2})_b—(R_7SiO_{3/2})_c—[(R_8)_2SiO_{2/2}]_d \quad \text{Formula (3)}$$

wherein each of $R_6$, $R_7$ and $R_8$ is independently selected from the group consisting of H, $C_1$-$C_{16}$ alkyl group, $C_1$-$C_{16}$ alkoxy group, and combinations thereof; the subscript a is an integer of 2 to 100, each of the subscripts b, c and d is independently an integer of 0 to 200, and 3≤a+b+c+d≤800.

5. The combined composition according to claim 1, wherein the noble metal-siloxane complex catalyst comprises at least one noble metal and a siloxane ligand, wherein the noble metal is selected from the group consisting of Pt, Pd, Ru, Rh, Os, Ir, Ag, alloys and mixtures thereof, and the siloxane ligand is a mono-siloxane, disiloxane, trisiloxane or tetrasiloxane optionally comprising one or more substituting groups selected from the group consisting of hydrogen, $C_1$-$C_{16}$ alkyl, $C_1$-$C_{16}$ alkoxy, $C_2$-$C_{16}$ alkenyl.

6. The combined composition according to claim 1, wherein first formulation comprising 80-99 wt % vinyl-functionalized polysiloxane, 0.05-10 wt % non-vinyl polysiloxane, and 0.05-10 wt % noble metal-siloxane complex catalyst, based on the total weight of the first formulation.

7. The combined composition according to claim 1, wherein the olefin (co)polymer is a homopolymer of a $C_2$-$C_{16}$ alkene, a copolymer of two or more $C_2$-$C_{16}$ alkenes or a copolymer of at least one $C_2$-$C_{16}$ alkenes with at least one vinyl comonomer; and the olefin-(meth)acrylic copolymer is a copolymer of at least one $C_2$-$C_{16}$ alkene with at least one (meth)acrylic monomer, and the (meth)acrylic monomer comprises methacrylic acid, acrylic acid, methacrylamide, acrylamide, methacrylonitrile, acrylonitrile, ($C_1$-$C_{12}$)alkyl methacrylate, ($C_1$-$C_{12}$)alkyl acrylate, and any combinations thereof.

8. The combined composition according to claim 1, wherein the second formulation comprises 10-50 wt % of the olefin (co)polymer, 2-30 wt % of the olefin-(meth)acrylic copolymer and 30-75 wt % of water, based on the total weight of the second formulation.

9. A repulpable release liner prepared with the combined composition according to claim 1, comprising (I) a release layer formed with the first formulation;

(II) an intermediate layer formed with the second formulation; and (III) a backing layer.

10. The repulpable release liner according to claim 9, wherein the backing layer is made from a repulpable material selected from the group consisting of Kraft paper, coated Kraft paper, pressure-sensitive paper, cellophane, coated cellophane, gummed paper, recycled paper, polylactic acid, polybutene succinate/caproate, polyhydroxybutyrate/valerate, polyvinyl succinate, polycaprolactone, starch, modified cellulose, and any combinations thereof.

* * * * *